Oct. 7, 1969    M. R. HUTCHISON, JR    3,471,225
AUTOMATIC FOCUSING MOTION PICTURE PROJECTOR
Filed Dec. 5, 1966    2 Sheets-Sheet 1
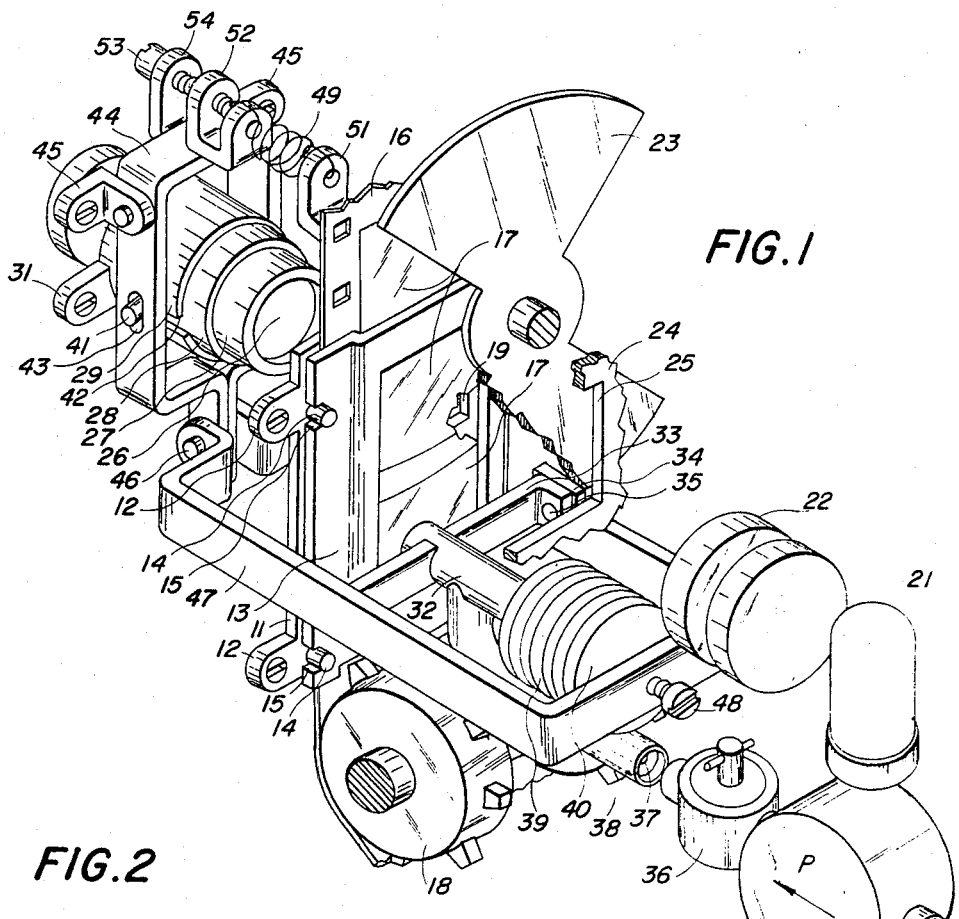
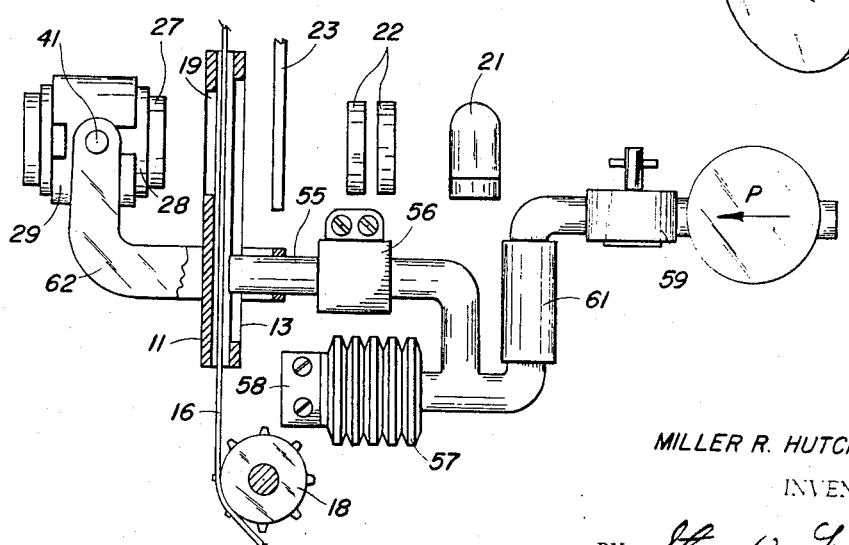
MILLER R. HUTCHISON JR.
INVENTOR.
BY
ATTORNEYS Oct. 7, 1969  M. R. HUTCHISON, JR  3,471,225
AUTOMATIC FOCUSING MOTION PICTURE PROJECTOR
Filed Dec. 5, 1966  2 Sheets-Sheet 2

MILLER R. HUTCHISON JR.
INVENTOR.

BY Steve W. Crombou
Robert W Hampton
ATTORNEYS

United States Patent Office 3,471,225
Patented Oct. 7, 1969

3,471,225
AUTOMATIC FOCUSING MOTION
PICTURE PROJECTOR
Miller R. Hutchison, Jr., Rochester, N.Y., assignor to Eastman Kodak Company, Rochester, N.Y., a corporation of New Jersey
Filed Dec. 5, 1966, Ser. No. 599,244
Int. Cl. G03b 3/00, 21/50
U.S. Cl. 352—140                                14 Claims

ABSTRACT OF THE DISCLOSURE

An automatic focusing mechanism for a motion picture projector measures film distortion at a sensing position spaced from the projection position. The sensing position is selected such that film distortion in such position bears a meaningful relation to the film distortion at the projection position. Moreover, since the sensing position is spaced from the projection position, the distortion measuring mechanism may be located where it will not interfere with the optical system or add to film gate congestion.

---

The present invention relates to photographic projectors and, more particularly, to automatic systems for adjusting optical components of motion picture projectors to maintain the image projected thereby in proper focus.

Inherent in all optical projectors in which an image of an illuminated information-bearing surface is focused on a screen by a projection lens, is the problem of maintaining the projected image in sharp focus on the screen. Loss of sharp focus results as the distance between the lens and the illuminated film surface changes due to distortion of the surface under the influence of the heat generated by the source of intense illumination to which it is subjected or due to variations in the placement of successive surfaces at the time each is moved into projecting position.

In attempting to overcome this problem, a number of prior art automatic focusing systems have been devised in which the distance between the illuminated surface and the lens is constantly measured and adjusted to maintain a predetermined "in focus" spacing. In any such automatic focusing system, to which the present invention also relates, it is essential that the illuminated surface be undamaged by the means employed to determine the position thereof, as might occur if mechanical tactile means were employed. Additionally, it is also essential that such means do not alter the projected image of the illuminated surface, as would result if opaque or light-refracting members were interposed in the optical path of the system during the projection of the image.

Of such devices previously developed, two types of systems appear to be particularly meritorious and have proven to be practical for use in still type projectors, e.g., slide projectors. In one of these two types of systems, as shown in U.S. Patent 3,037,423, a beam of light is reflected from the illuminated surface at an acute angle so that any displacement of the surface results in a corresponding deflection of the reflected beam, and then any such movement of the reflected beam is detected by light sensing cells and translated by a servomechanism into an appropriate mechanical adjustment of the optical system. In the other system, which is described in co-pending U.S. application Ser. No. 432,695, filed Feb. 15, 1965, by William E. White, a stream of air is directed onto or across the illuminated film surface and the optical system is adjusted as a function of the resistance imposed on the flow of air, the resistance varying in accordance with the size of a narrow passageway defined by the film surface and an optically transparent means positioned closely adjacent thereto.

However, neither of these two systems, nor any other system for determining changes in the position of the illuminated film surface, has found commercial acceptance in motion picture projectors, because of particular problems involved in incorporating such systems in projectors of the that type, such particular problems being either nonexistent or much less critical in still type projectors.

In the following description of the above-mentioned problems peculiar to cinematographic projectors and of the present invention whereby such problems are substantially circumvented, the term "filmstrip" is intended to include any information-bearing surface adapted to be focused on a projection screen. However, in the context of conventional motion picture projection, the term will be understood to refer to an elongate strip of processed light-transmissive photographic film having therealong a series of picture frames which are focused on the screen sequentially to produce an apparently animated image.

In a motion picture projector adapted to utilize such a filmstrip, the filmstrip is supported along its edges in a so-called "gate," which includes an aperture aligned with the lens and with the light source, and the film is advanced to bring each frame, in turn, into momentary stationary alignment with the aperture, while the image thereof is projected onto the screen. During the excursion of the filmstrip across the aperture, the illumination of the film is interrupted, so that the film is illuminated in the aperture area only while in stationary relation thereto. Such illumination of the filmstrip is generally required to be considerably more intense than that utilized in a still type projector, because of the relatively smaller area of each picture frame in relation to the desired size of the projected image thereof. In addition to this intense visible illumination, the filmstrip is also subjected to infrared radiation emitted from the various structural components of the projector in the congested vicinity of the gate, these components being raised to relatively high temperatures by the same intense illumination despite the forced circulation of air customarily employed to cool such elements.

Prior to entering the gate area, the film is at substantially room temperature and humidity. As the projector is operated, the filmstrip is drawn through the gate, one frame at a time, at a rate which is generally 24 frames per second for sound film and 18 frames per second for silent film. In the projection of sound film, a typical sequence is as follows: a frame enters the aperture area with the illumination momentarily terminated by the shutter; when the shutter opens, the frame is subjected to intense illumination for approximately 16 milliseconds; the illumination is then terminated for about 5 milliseconds by a so-called "flicker blade" incorporated in the shutter to reduce the flickering appearance of the projected image; the illumination is resumed for another interval of approximately 16 milliseconds; and then the illumination is again terminated for 5 milliseconds, during which time the strip is advanced to bring the next frame into alignment with the aperture. Thus, during the complete cycle interval of approximately 42 milliseconds, the film is exposed to direct illumination for about 32 milliseconds, comprising two 16 millisecond intervals.

During this period of intense illumination, the film forms the screen image by localized absorption of radiation, which necessarily means that the film becomes hottest in the least transparent areas thereof, both from the visible and invisible radiation to which it is exposed. Since the thermal conductivity of the film is relatively low, localized areas of high temperature are formed almost instantaneously and both shrinkage and expansion take place in localized areas due to the resulting local changes in temperature and moisture content. The resulting distortion pattern is unique with each frame, but the overall distortion generally results in a displacement of the film toward the projection lamp and away from the lens varying in extent from scene to scene, but less so in given pictorial sequence.

From the foregoing description, it is apparent that the environment of the exposure aperture in the film gate of a motion picture projector is inhospitable to accurate and continuous determination of relatively small displacements of the filmstrip in that aperture. Known gauging means of the requisite sensitivity are also responsive to radiation, directly or indirectly, and their accuracy is impaired particularly by intermittently applied radiation of such strength as is typical of projectors. For example, in a pneumatic system, accurate position detection depends upon minute changes in pressure of the working fluid, usually air and such air pressure would also vary as a function of the fluctuating film gate temperature. Similarly in a photo-electric system including a servomechanism to position the projection lens, extraneous light due to scattering of the projection beam by the filmstrip and metal surfaces of the aperture plate reduces system sensitivity while the intermittency of the radiant energy introduces oscillation or "hunting." It has been impractical to overcome these objections to the aperture as a site for filmstrip distortion measurement and, apparently, no example of a satisfactory solution has as yet won public acceptance.

In view of the foregoing considerations, a primary object of the present invention is to provide, in a motion picture projector, an automatic focus adjusting device of the surface position determining type, and to maintain the projected image in uniform focus.

An equally important object of the invention is to simplify the construction of such an automatic focusing device while, at the same time, improving the accuracy and dependability thereof in accomplishing the automatic focusing of such a projector.

Another object of the invention is to simplify still further the construction of a reliable automatic focusing system for a motion picture projector by means of a film position sensing device responsive to the temperature of the filmstrip.

The means by which these and other important objects of the invention are readily accomplished involves a relatively simple but nevertheless unobvious discovery, whereby many of the above-described complicating factors may be circumvented substantially, with the result that such automatic focusing systems can be incorporated practicably and advantageously in motion picture projectors.

After a projection cycle has been completed, as described above, the picture frame which has just been projected onto the screen is advanced past the aperture and again dwells for approximately 37 milliseconds while the succeeding frame is being projected. In its new location, the previously projected frame is still supported in coplanar relation to the succeeding frame by the gate structure and is still engaged by the hot gate structure, but it is shielded from the intermittent irridation beam. Therefore, due to the low heat conductivity of the filmstrip, the short lapse of time, and the similar ambient temperature conditions at the new location, the distortion experienced by this particular frame of the filmstrip will not change substantially during the short time the frame remains at this new location; or, in any event, the distortion determined at this location will bear a substantially uniform relation to that acquired at the projection site. Accordingly, rather than attempting to overcome, at the aperture, the previously described problems encountered in gauging the position of the filmstrip in said aperture, the present invention contemplates performing the gauging function by measuring such distortion after the film has been moved out of the aperture to its next dwell position, or even to a later dwell position, in which the film distortion still bears a meaningful relation to the distortion acquired at the aperture, thereby permitting the gauging means to be positioned beyond the influence of the intermittent projection beam and the position in which such gauging means could interfere with the optical system or add to gate congestion.

The novel features considered characteristic of the invention herein are set forth with particularity in the appended claims. The invention itself, however, both as to its organization and method of operation, together with additional objects and advantages thereof, will best be understood from the following description of illustrative embodiments when read in conjunction with the accompanying drawings, wherein corresponding parts are identified by like numerals and in which:

FIG. 1 is a perspective view of a preferred embodiment of the invention, showing a pneumatic system for determining the distortion of the filmstrip in a motion picture projector and for mechanically adjusting the projection lens to compensate for such distortion;

FIG. 2 is a partial diagrammatic side view of a second embodiment of the invention, likewise comprising a pneumatic system, but employing a feedback responsive adjustment mechanism;

Figure 4:
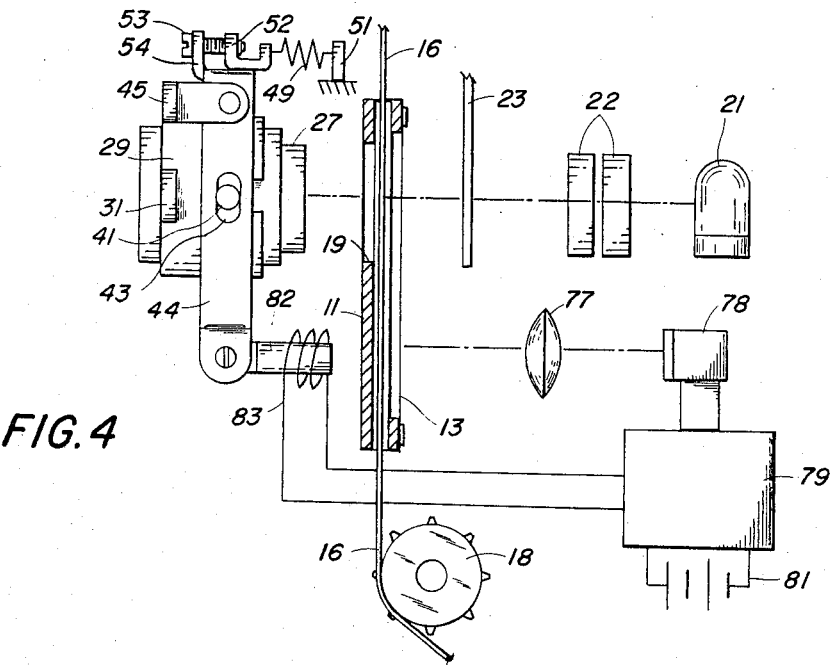
Figure 3:
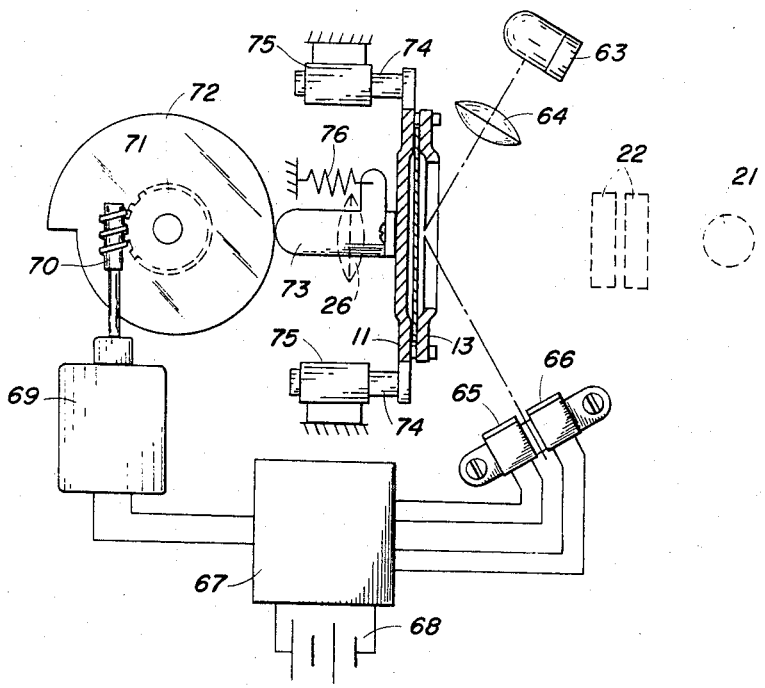

FIG. 3 is a partial diagrammatic top view of a third embodiment of the invention utlizing a reflected light system to determine the distortion of the film strip and to adjust the position of the film gate accordingly; and FIG. 4 is a partial diagrammatic side view of a further embodiment of a film distortion measuring system according to the present invention, in which the distortion is determined as a function of the temperature of the filmstrip.

Referring now to FIG. 1 of the drawings, the automatic focusing motion picture projector apparatus illustrated thereby comprises a film gate including an aperture plate 11 rigidly supported on the projector housing (not shown) by lugs 12 and a pressure plate 13 maintained in alignment with the aperture plate by pins 14 attached to plate 13 and extending through slots 15 in the pressure plate. The filmstrip 16 is supported along its lateral edges between the aperture plate and the pressure plate, the latter being resiliently urged toward the aperture plate by resilient mean (not shown). The central portions of the plates adjacent the frame areas 17 of the filmstrip are spaced from the filmstrip, with the lateral portions of the plates, supporting the film strip, defining a flat plane throughout the length of the gate. During the operation of the projector, the filmstrip is moved downwardly through the gate by an intermittently rotating sprocket 18 to bring the frame areas 17 successively into stationary alignment with aperture 19 in plate 11.

The illuminating system of the projector comprises a high intensity lamp 21 and a condensing lens system 22 adapted to illuminate uniformly the frame of the filmstrip aligned with aperture 19. As previously described, the filmstrip is illuminated in the aperture area only during the dwell interval during which a frame thereof is in stationary alignment with the aperture, such intermittent illumination being accomplished by a rotary shutter blade 23, rotated in predetermined timed relation to the movement of sprocket 18 (by means not shown). The illustrated shutter blade 23 is only representative of an actual shutter blade, and, therefore, does not depict means for producing the aforementioned flicker-reducing illumination interruption and is not necessarily properly proportioned to provide the particular time intervals previously described.

To reduce unnecessary heating of the gate, the filmstrip and other illustrated elements, by the intense illumination from lamp 21, a plate 24 is positioned forwardly of lenses 22 and is provided with a rectangular opening 25 which prevents direct illumination of areas of the filmstrip and gate remote from the aperture 19. It should be understood that air circulating means may be provided to cool the various elements of the projector exposed to heating influences, as is conventional practice in most types of photographic projectors, such means, however, having been omitted in the drawings.

The image projecting system of the projector comprises a projector lens 26 housed in alignment with aperture 19 in tubular casing 27. Casing 27 is axially movable in a concentric supporting tube 28, which, in turn, is freely movable in an axial direction in support tube 29 rigidly affixed to the projector housing (not shown) by a pair of mounting lugs, one of which is shown at 31. Accordingly, by moving casing 27 within tube 28, the lens can be adjusted relative to an illuminated film frame to focus a sharp image of the film frame, as defined in area by aperture 19, onto a projection screen (not shown).

However, as previously described, any deviation of the position of the illuminated film frame relative to the lens, as is occasioned by the generally rearward displacement of the film resulting from its distortion under the influence of the intense illumination, will require a further corresponding adjustment to preserve the sharpness of the projected image. In the embodiment of the invention shown in FIG. 1, this is accomplished by means of a pneumatic gauging device which evaluates the degree of distortion of the illuminated frame by reference to the measured distortion of the previously projected frame, and which automatically effects a corresponding adjustment of lens 26.

The pneumatic gauging device employed comprises a nozzle tube 32, which is rigidly supported by cross-member 33 attached to aperture plate 11 by support arms as shown at 34. To provide for adjustment of the spacing of the adjacent end of the nozzle tube from the gate, elongate holes may be provided in the support arms to which the cross-member is attached by screws as shown at 35, but it should be understood that the nozzle tube remains in fixed relation to the gate during the operation of the projector. Thus supported, completely outside of the path of the optical system of the projector and beyond the illuminated area of the gate, the open end of the nozzle tube, which defines a measuring jet, is disposed in close proximity to the surface of the film frame which has just been advanced from the aperture position to its succeeding dwell position.

In this position the film position spacing means occupies a stable environment and measurement of film frame distortion bears a determinable relation to that currently occurring to the succeeding frame occupying the projection aperture. If desired, the ambient conditions affecting the film in the gauging position may be modified by obvious expedients to maintain uniform stability.

As is well known in the air gauging art, in which similar devices are used in extremely accurate industrial gauging operations, the film position detecting system includes an appropriate air compressing pump, illustrated schematically in FIGURES 1 and 2, provided with an adjustable pressure regulator 36 to provide a flow of air under constant pressure. Beyond the pressure regulator, a so-called master jet 37 is located in air tube 38, connecting the regulator to the nozzle tube, to impose a predetermined restriction on the flow of air, thereby establishing a substantially steady base pressure. As air is forced through the measuring jet, the airstream is deflected by the adjacent film surface. Since the direction of air flow is changed thereby, back pressure immediately builds up in tubes 32 and 38; and the closer the film is to the measuring jet, the higher the back pressure becomes and vice versa. To further stabilize the operation of the gauging system and the influence of the air from the measuring jet on the film itself, the moisture content, temperature and cleanliness of the air may be controlled by appropriate well-known means.

To measure the pressure in the tubes, the illustrated embodiment utilizes a bellows 39, which expands in a rearward direction as the pressure in the tubes increases, whereby any deviation of the position of the filmstrip relative to the measuring jet at the end of the nozzle tube results in a proportional but amplified displacement of the rearward surface 40 of the bellows. In order to translate, proportionally, the amplified displacement of the rearward surface 40 of the bellows into an appropriate correspondingly smaller adjustment of the projection lens, the concentric supporting tube 28 is provided with a pair of oppositely disposed pins, as shown at 41, extending through corresponding slots 42 in support tube 29 and into elongate holes 43 in a yoke member 44 pivotally attached to angle brackets 45 secured to the projector housing (not shown). The yoke member, in turn, is pivotally connected at its bottom end by a pin 46 to a stirrup member 47 which engages the bellows by means of an adjustable screw 48, the end of which is received in a concavity (not shown) centrally located on surface 40. The yoke member is maintained in engagement with the bellows through screw 48 by means of a relatively weak tension spring 49 connected between a stationary spring support member 51, mounted in immovable relation to the film gate, and a movable spring support member 52, located atop the yoke member and adjustable thereon by means of screw 53 threaded through lug 54 on the yoke member. By this linkage arrangement, movement of the rearward surface of the bellows causes the lens to be moved in the same direction and by a distance bearing a predetermined functional relationship to the movement of the bellows, thereby preserving the preestablished focus of the projected image.

The embodiment of the invention shown in FIG. 2 operates in the same general manner as the embodiment just described, except that, rather than utilizing a stationary nozzle tube, and moving the lens as a function of the spacing of the filmstrip from the measuring jet thereof, this embodiment employs a "feedback" mode of operation to maintain the end of the nozzle tube automatically at a predetermined distance from the distorted filmstrip, with the lens being adjusted in accordance with the position assumed by the nozzle tube.

As shown at 55, the rigid nozzle tube is supported in the same general position relative to the gate as previously described, but is adapted to be moved axially within a stationary supporting sleeve 56 by the expansion or contraction of bellows 57 attached at one end to a stationary element (not shown) of the projector by an adjustable bracket 58. To allow such movement of the bellows and nozzle tube, the air tube 55 is attached to the pressure regulator 59 on the air pump by means of a flexible tubular member 61. As air is forced out of the measuring jet defined by the open end of the nozzle tube, with the film immediately adjacent thereto, the back pressure developed in the bellows will increase as the filmstrip approaches the jet, thereby causing the bellows to expand and withdraw the nozzle tube until it reaches a position where the corresponding pressure within the bellows exerts an expansive force in equilibrium with the contractive force exerted by the restorative resiliency of the material of which the bellows is formed. Once such a position of equilibrium is established, any movement of the film will result in a corresponding movement of the nozzle tube.

As the rearward distortion of the filmstrip increases, the spacing of the nozzle tube therefrom at the equilibrium position will decrease slightly, and vice versa, due to the increased force required to expand the bellows by each successive increment, but, for practical purposes, it is not necessary generally to compensate for this variation, which is so minute over the short distance through which the nozzle tube moves that the spacing can be considered to be constant. Accordingly, to maintain the lens substantially at the distance from the filmstrip established by its initial focusing adjustment, regardless of subsequent film distortion, the nozzle tube may be connected to pins 41 mounted on concentric lens supporting tube 28 by a rigid link member 62, immovable relative to the nozzle tube, whereby the lens and the nozzle tube move as unitary element.

Alternatively, the same type of structure could be employed to adjust the position of the film gate rather than of the lens, by supporting the nozzle tube in a fixed position and coupling the bellows to a movable gate, whereby the filmstrip would be maintained in constant spaced relation to the nozzle tube and thereby to the lens.

While the foregoing embodiments involve mechanical translation of the bellows movement to adjust the lens, other means can also be employed to measure the pressure in the pneumatic system and to effect a corresponding adjustment of the optical system of the projector. For example, a particularly sensitive means for measuring such pressure comprises a so-called rotameter, in which air flowing through a tapered tube causes a light float member therein to rise in proportion to the pressure of the air stream. By attaching such a device to the nozzle tube and electrically determining the position of the float member, e.g., by using a conductive float member, the position of which determines the reactance of an oscillator coil, an electrical signal proportional to the air pressure in the nozzle tube can be obtained and utilized to control an electrical focus adjustment servomechanism as illustrated in connection with FIG. 3 or 4.

Similarly, since the bellows shown in FIGURES 1 and 2 must be relatively large in order to adjust the optical system of the projector entirely by mechanical means, the correspondingly relatively large volume of air in the bellows reduces the speed with which the system is capable of responding to movement of the film relative to the measuring jet. However, this lag in response is generally acceptable and is actually a desirable attribute in most instances, inasmuch as it minimizes rapid oscillations in the focusing system and provides more gradual adjustments corresponding to the average displacement of adjacent film frames. If it is desired to increase the response speed in a generally similar system, this can be accomplished readily by using a smaller and more sensitive bellows, the movement of which is detected and translated into an adjustment of the optical system by an electrical servomechanism as mentioned above.

In the embodiment shown in FIG. 3, the system employed for determining the position of the film is located in the same general location as the previously described nozzle tube, beyond the gate aperture area. The optical projection system employed in this embodiment may be substantially identical to that shown in FIG. 1, except that the lens need only be manually adjustable, for which reason these components have been shown only schematically by broken lines in the interest of clarity. This embodiment comprises a light source 63, a lens 64 for focusing a beam of light from the light source onto the central portion of the filmstrip at an acute or grazing angle thereto, and a pair of narrowly spaced photocell members 65 and 66, electrically connected to a transducer device 67, associated with a power source 68.

When the filmstrip is in the position shown in the drawing, the beam of light reflected therefrom is aligned with the space between the two photocells and does not impinge on either of them. If distortion of the film causes it to move rearwardly relative to the gate, the reflected beam is correspondingly displaced and impinges on photocell 66, thereby generating an electrical signal which is fed to transducer 67 and translated thereby into an electrical output causing motor 69 to rotate in a predetermined direction. The motor, in turn, is connected by gears 70 and 71 to a cam 72, in engagement with a cam follower member 73 attached to aperture plate 11. The aperture plate, and hence the gate, is supported in the projector by support rods 74 slidably mounted in stationary guides 75 for movement along the optical axis of the projector against the resilient influence of a spring 76. Accordingly, such rotation of the motor displaces the gate forwardly until the motor actuating signal is terminated by the re-alignment of the reflected beam with the space between the photocells, which occurs when the filmstrip has been restored to its initial position. Movement of the filmstrip in a forward direction will result, similarly, in the beam impinging on photocell 65, in response to which the motor will be energized in the opposite direction by transducer 67 to move the gate in a rearward direction until the filmstrip is again at the position in which no signal is produced by the photocells. Thus, this system maintains the filmstrip at all times at a constant distance from the projector lens, which, therefore, requires no further adjustment after having been focused initially with the filmstrip at its central position.

Rather than adjusting the gate, the same type of system can be employed to adjust the lens, by operatively connecting the lens to a movable element of the film sensing system to obtain the feedback mode of operation just described.

The embodiment of the invention shown in FIG. 4 utilizes a somewhat different principle to determine the position of the filmstrip, but the basic projector mechanism employed may be the same as that previously described. In this embodiment, the position of the filmstrip is not measured directly, but is determined as a function of the temperature of the filmstrip which being the factor which causes the distortion of the film, is functionally related to the degree of distortion so produced.

To measure the temperature of the filmstrip, infrared radiation emitted by a predetermined area of that frame of the filmstrip in the dwell position subsequent to the illumination position is focused by lens 77 onto an infrared sensitive photoelectric cell 78. The cell in turn is electrically connected to a transducer 79, connected to a power source 81 and adapted to produce an electrical output proportional to the amount of radiant energy impinged on the photocell. Therefore, since the distortion of the film is proportionally related to the temperature of the film, or of such predetermined area thereof, the output of the transducer is likewise proportional to such distortion. As indicated earlier, such distortion normally occurs rearwardly toward lamp 21. Accordingly, the output of the transducer may be employed to maintain the lens in substantially constant spatial relation to the filmstrip, for example, by employing a lens mounting structure similar to that illustrated in FIG. 1, but in which the yoke member 44 is attacherd at its lower end to the armature 82 of solenoid 83 energized by the output of the transducer. By this arrangement, the lens is moved against the influence of adjustable spring 49 to maintain the pre-established spatial relation between the filmstrip and the projection lens.

While the foregoing description is directed to specific embodiments, it is obvious that modifications are possible without departing from the spirit of the invention. For example, although each of the figures illustrates a particular type of position sensing system associated with appropriate means for adjusting a specific element of the projector, it is apparent that each of these general types of film sensing devices, or other analagous devices, could be employed with any of the illustrated forms of servomechanisms, or equivalents thereof, to adjust either the position of the lens or of the filmstrip, as desired. Accordingly, the present disclosure is to be considered as illustrative and not as limiting the scope of the invention, which is defined by the following claims.

I claim:
1. In a motion picture projector comprising:
 (a) a film gate for supporting an elongate filmstrip for longitudinal movement therethrough;
 (b) means for moving such filmstrip longitudinally through said gate in a predetermined direction;
 (c) means for illuminating at least a portion of the filmstrip so supported in said gate;
 (d) aperture means defining an area of the portion of the filmstrip so illuminated; and
 (e) focusing means including lens means in adjustable spaced relation to said gate for focusing at a point remote therefrom an image positioned in the film area defined by said aperture means;

the improvement comprising:

(f) film position sensing means for sensing displacement, relative to a predetermined position, of a surface of said filmstrip located within a predetermined zone outside of said illuminated film area defined by said aperture means and for producing an output corresponding to said displacement; and (g) means responsive to said output for automatically adjusting the spatial relation between said lens means and the surface of said defined film area to maintain image focus at said remote point.

2. A projector according to claim 1 in which the output produced by said sensing means is proportional to both the magnitude and direction of said displacement.

3. A projector according to claim 1 including feedback means operatively connecting said sensing means and said adjustable focusing means, said spatial relation between said lens means and said defined film area being adjusted in proportion to the movement required of one of the elements comprising said film surface and said sensing means to maintain a predetermined positional relation between said elements.

4. A projector according to claim 1 in which said film position sensing means comprises:

(a) air supply means;

(b) channel means for conducting air from said air supply means and including nozzle means defining a passageway through which air is exhausted from said channel means, said nozzle means being disposed relative to the film surface within said zone such that said passageway is restricted thereby in proportion to displacement of said surface in a direction substantially normal thereto; and (c) pressure sensing means for producing an output proportional to the air pressure within said channel means as determined by such restriction.

5. A projector according to claim 1 in which said film position sensing means comprises:

(a) light beam projecting means for reflecting a beam of light from the film surface within said zone;

(b) reflected light sensing means responsive to said beam reflections for producing an output indicative of the displacement of the reflected light beam resulting from a corresponding displacement of said surface.

6. A projector according to claim 1 in which said film position sensing means comprises temperature sensing means for measuring the temperature of the filmstrip within said zone and for producing an output proportional to said temperature.

7. A device according to claim 6 in which said temperature sensing means comprises:

(a) a photoelectric cell responsive to infrared radiation for producing an electrical output proportional to the intensity of such radiation; and (b) focusing means for focusing upon said photoelectric cell infrared radiation emitted by the filmstrip in said zone.

8. A motion picture projector adapted to accommodate an elongate filmstrip having a plurality of image areas uniformly spaced therealong, said projector comprising:

(a) a film gate for supporting said filmstrip along a length thereof sufficient to include at least two adjacent image areas;

(b) film feed means for advancing said filmstrip intermittently through said gate to locate each image area of the supported portion of said filmstrip in a first dwell position and thereafter in a second dwell position;

(c) light source means for illuminating the image area of said filmstrip in said first dwell position;

(d) adjustable means for focusing, at a focal plane remote from said projector, an image of the area illuminated at said first dwell position;

(e) film position sensing means for determining, relative to a predetermined reference plane, the displacement of a portion of the image area at said second dwell position; and (f) automatic means operatively connecting said adjustable means and said film position sensing means for adjusting the focus of said projected image in accordance with such displacement.

9. In an optical projector of the type in which a filmstrip is subjected to illumination for projecting images of information recorded thereon, a device for detecting distortion of said filmstrip occurring as a result of the localized heating of said filmstrip produced by said illumination, said device comprising: temperature sensing means for monitoring an area of said filmstrip heated by such illumination and for determining the temperature thereof, and means responsive to such temperature determination for indicating the distortion of said area as a function of said determination.

10. A projector according to claim 9 including means for adjusting the focus of said projected images, wherein said indicating means includes an element interconnected with said focus adjusting means for adjusting said focus as a function of the temperature of said monitored filmstrip area.

11. A projector according to claim 9 including means for moving said filmstrip past a zone in which it is illuminated, said temperature sensing means being positioned to monitor an area beyond said zone along the direction of movement of said filmstrip.

12. A projector according to claim 9 in which said temperature sensing means comprises photoelectric means responsive to infrared radiation emitted by said monitored filmstrip area.

13. In a film image projection apparatus having an objective lens which is movable to establish a given lens to film distance in which an image of the film in a normal plane is projected on a screen or the like in a focused condition, the combination comprising:

film gate means for supporting the film in a normal plane with a first portion of the film including an image in a projecting position;

film position sensing means for (1) cooperating with a second portion of the film located outside of said first film portion at said projecting position, and sensing any film displacement due to buckling or the like from said normal plane, the film displacement in the projecting position changing the given lens to film distance to place the projected film image in an unfocused condition, and for (2) producing an output corresponding to said film displacement; and means responsive to said output for automatically restoring and maintaining said given lens to film distance.

14. The invention according to claim 13 wherein said film position sensing means comprises:

air supply means;

means including nozzle means for directing air from said air supply means against said portion of the film and the end of said nozzle means; and pressure sensing means for sensing said air pressure and producing an output porportional thereto.

References Cited

UNITED STATES PATENTS

| 2,563,892 | 8/1951 | Waller et al. | 352—70 |
| 3,249,006 | 5/1966 | Stauffer. | |
| 3,326,081 | 6/1967 | White. | |

FOREIGN PATENTS

| 903,962 | 2/1945 | France. |
| 823,404 | 11/1959 | Great Britain. |

JULIA E. COINER, Primary Examiner

U.S. Cl. X.R.

352—92